US00RE50242E

(19) United States
(12) Reissued Patent
Yang et al.

(10) Patent Number: US RE50,242 E
(45) Date of Reissued Patent: Dec. 24, 2024

(54) SYSTEMS AND METHODS FOR INDICATION OF CABLE ID MATCHING STATUS

(71) Applicant: QUANTA COMPUTER INC., Taoyuan (TW)

(72) Inventors: Ting-Hao Yang, Taoyuan (TW); Tsu-Tai Kung, Taoyuan (TW); Hou-Lung Lin, Taoyuan (TW)

(73) Assignee: QUANTA COMPUTER INC., Taoyuan (TW)

(21) Appl. No.: 17/559,724

(22) Filed: Dec. 23, 2021

Related U.S. Patent Documents

Reissue of:
(64) Patent No.: 10,515,042
Issued: Dec. 24, 2019
Appl. No.: 16/013,526
Filed: Jun. 20, 2018

(51) Int. Cl.
*G02B 6/38* (2006.01)
*G06F 13/16* (2006.01)
(Continued)

(52) U.S. Cl.
CPC ..... *G06F 13/4068* (2013.01); *G02B 6/3895* (2013.01); *G06F 13/1668* (2013.01);
(Continued)

(58) Field of Classification Search
CPC ..... H01B 7/32; G02B 6/3895; G02B 6/38; G06F 13/4068; G06F 13/4282;
(Continued)

(56) References Cited

U.S. PATENT DOCUMENTS

2007/0195711 A1* 8/2007 Morris ..... H04L 41/12 370/254
2008/0115957 A1* 5/2008 Duffy ..... H01B 7/32 340/815.4
(Continued)

FOREIGN PATENT DOCUMENTS

CN 102726056 B 11/2015
JP 2011205448 A 10/2011
(Continued)

OTHER PUBLICATIONS

JP Office Action for Application No. 2018-167147, mailed Dec. 17, 2019, w/ First Office Action Summary.
(Continued)

*Primary Examiner* — B. James Peikari
(74) *Attorney, Agent, or Firm* — NIXON PEABODY LLP

(57) ABSTRACT

A network system for identifying a cable connection is provided. The network system includes a management server, a server device, and a storage device. The management server includes system-management software. The server device is connected to the management server. The server device includes a BMC configured to communicate with the system-management software of the management server. The storage device includes at least one cable port configured to receive a storage cable that connects the storage device to the server device. The cable port includes a non-volatile memory, an indicator light, and a $I^2C$ bus.

17 Claims, 4 Drawing Sheets

(51) Int. Cl.

| | |
|---|---|
| ***G06F 13/40*** | (2006.01) |
| ***G06F 13/42*** | (2006.01) |
| ***H04L 12/26*** | (2006.01) |
| ***H04L 41/12*** | (2022.01) |
| *H04L 43/10* | (2022.01) |
| *H04L 67/10* | (2022.01) |

(52) U.S. Cl.
CPC ..... *G06F 13/4282* (2013.01); *H04L 41/12* (2013.01); *G06F 2213/0016* (2013.01); *H04L 43/10* (2013.01); *H04L 67/10* (2013.01)

(58) Field of Classification Search
CPC ..... G06F 13/1668; G06F 2213/0016; H04L 41/12; H04L 43/10; H04L 67/10
See application file for complete search history.

(56) References Cited

U.S. PATENT DOCUMENTS

| | | | | |
|---|---|---|---|---|
| 2011/0043371 | A1* | 2/2011 | German | G06F 13/4282 340/815.45 |
| 2012/0179869 | A1 | 7/2012 | Flynn et al. | |
| 2013/0137291 | A1* | 5/2013 | Abuelsaad | H01R 4/64 439/488 |
| 2014/0173156 | A1 | 6/2014 | Alshinnawi et al. | |
| 2015/0356041 | A1 | 12/2015 | Barnur | |
| 2016/0109662 | A1 | 4/2016 | Anne et al. | |
| 2016/0188216 | A1 | 6/2016 | Bi et al. | |
| 2016/0301575 | A1* | 10/2016 | Jau | H04L 41/0869 |
| 2017/0117959 | A1* | 4/2017 | Coffey | H04B 10/40 |
| 2020/0059710 | A1* | 2/2020 | Huang | H04B 10/502 |

FOREIGN PATENT DOCUMENTS

| | | | |
|---|---|---|---|
| JP | 2016536735 | A | 11/2016 |
| KR | 20060130517 | A | 12/2006 |
| WO | 2015/035791 | A1 | 3/2015 |

OTHER PUBLICATIONS

Extended European Search Report for EP Application No. 18192949.8, dated Feb. 5, 2019.
Lee et al., Open Compute Project, Big Basin—JBOG Specifications, Rev. 0.05, pp. 1-67, Jan. 2017.
TW Office Action for Application No. 107128853, dated Jul. 8, 2019, w/First Office Action Summary.
TW Search Report for Application No. 107128853, dated Jul. 8, 2019.

* cited by examiner

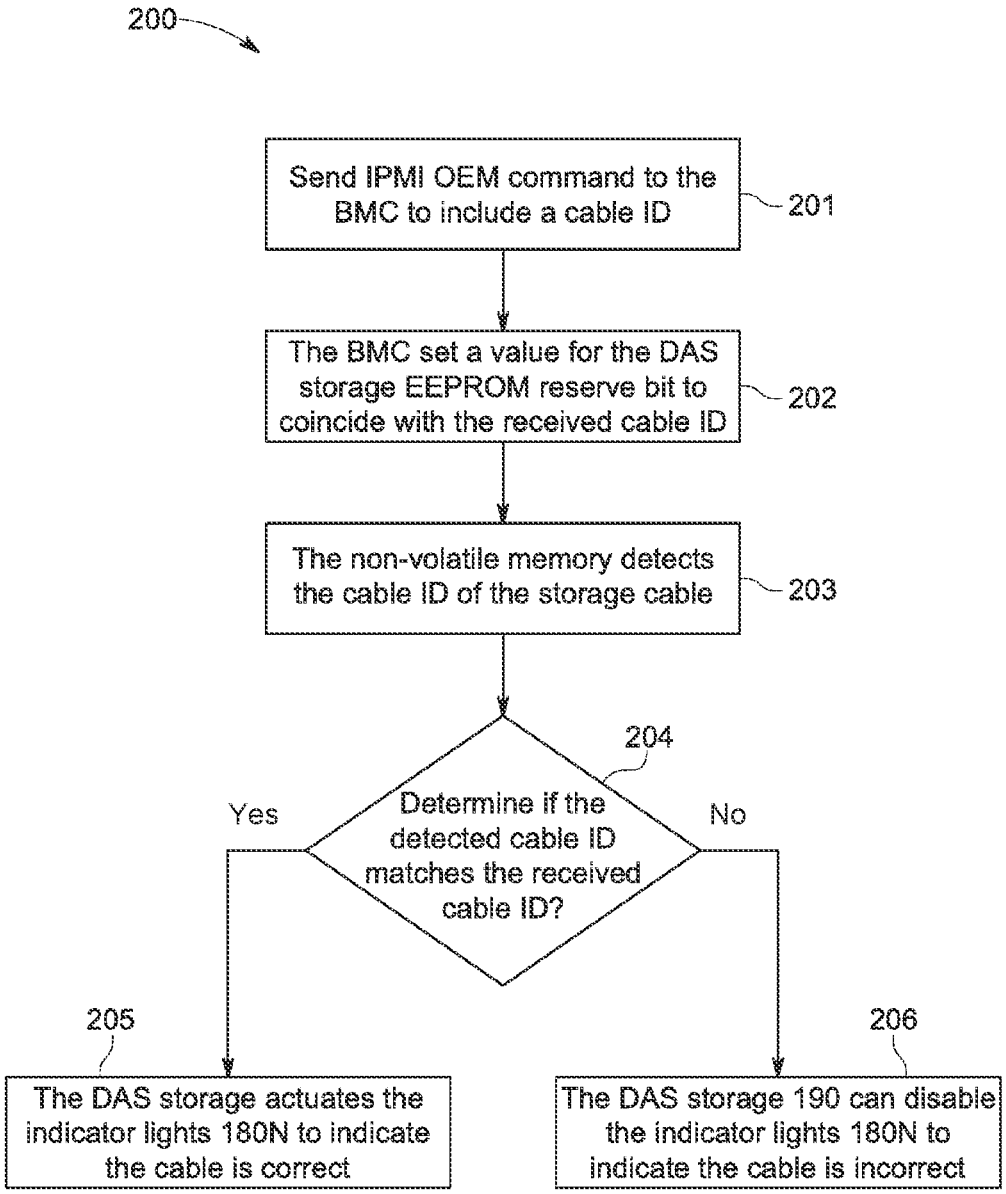
FIG. 2
(Amended)

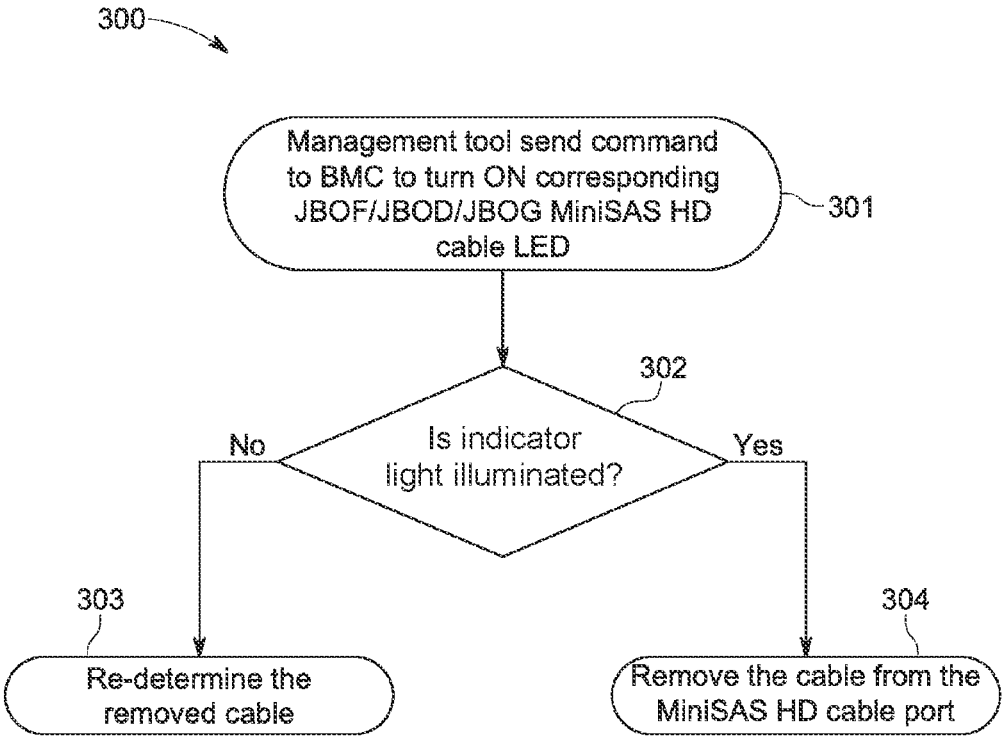
FIG. 3
(Amended)

SYSTEMS AND METHODS FOR INDICATION OF CABLE ID MATCHING STATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This application relates to a server device and method to detect proper cable assembly to improve assembly and problem diagnosis.

BACKGROUND

In the field of information systems, connecting equipment together is often a daunting task. In some instances, computing equipment [are] *is* connected by cables via connectors. In other instances, cables are connected to a board having a large number of pins. One example of such a connection is between a computer peripheral and a main or host computer. It is often a challenge to ensure the connector leading from a peripheral component is connected properly to the matching connector, or to the pins on a board.

When a system is powered up with an improperly connected component, the main system, such as a personal computer, will not work. Administrators or system owners may resort to dismantling their equipment to diagnose the problem, or call a customer support line to seek resolution of the problem—both of which are time-consuming approaches. Repeated unsuccessful attempts to connect cables can also result in damage to the computer or to a peripheral component, in the form of broken connection pins, improper connections of power supplies to ground, and improper connections of high voltage levels to delicate circuits.

To alleviate such issues, manufacturers typically provide diagrams illustrating the location for each connector. These diagrams can be quite complex, depending on the size of the system. Also, they do not address the proper orientation of a cable into a connector. Furthermore, this approach can only provide guidance to the user prior to connection. Once a faulty connection is made, the manufacturer provided diagram offers no assistance in rectifying the connection.

Manufacturers also typically use colored coating on a portion of the cable insulation leading up to a connector to prevent incorrect connection. While the color identification can aid the user in correctly identifying a particular pin on the connector, the part to which the connector will be attached, such as a motherboard, may not have color identification to match the connector. As with other conventional methods, this approach only helps the user prior to establishing the connection but does not offer assistance in correcting the connection.

Therefore, there is a need for a system and method for facilitating proper cable connections. Specifically, there is a need for a system and method for identifying proper cable connection, and to provide information to correct an incorrect cable connection.

SUMMARY

The following is a simplified summary of one or more embodiments in order to provide a basic understanding of present technology. This summary is not an extensive overview of all contemplated embodiments of the present technology. It is intended neither to identify key or critical elements of all examples, nor to delineate the scope of any or all aspects of the present technology. Its sole purpose is to present some concepts of one or more examples in a simplified form as a prelude to the more detailed description that is presented later.

A network system for identifying a cable connection is provided. The network system includes a management server, a server device, and a storage device. The management server includes system-management software. The server device is connected to the management server. The server device includes a BMC configured to communicate with the system-management software of the management server. The storage device includes at least one cable port configured to receive a storage cable that connects the storage device to the server device. The cable port includes a non-volatile memory, an indicator light, and an Inter-IC ($I^2C$) bus.

In some embodiments, the server device is communicatively coupled to the management server via a local area network. In some embodiments, the storage device can be a DAS storage. In some embodiments, the storage cable can include a MiniSAS HD cable. In some embodiments, the non-volatile memory can be an Electrically Erasable Programmable Read-Only Memory (EEPROM). In some embodiments, the indicator light can include a light-emitting diode (LED).

In some embodiments, the storage device can include a JBOD ("just a bunch of disks"), a JBOF ("just a bunch of flash"), a JBOG ("Just a Box of GPUs"), or any combination thereof as a RAID array. In some embodiments, the system-management software can be configured to send an IPMI OEM command to the BMC of the server device. The IPMI OEM command can include a CABLE ID of the storage cable. In some embodiments, the storage cable can include a MiniSAS HD cable. In some embodiments, the MiniSAS HD cable can connect a cable port of the at least one storage device to an Ethernet network interface of the server device.

A method for authenticating a cable connection also is provided. The method includes receiving, at a BMC on a server device, an IPMI OEM command including a CABLE ID. The method also includes receiving, from the BMC, a value for a storage device non-volatile memory reserve bit to coincide with the received CABLE ID. The method also includes detecting a CABLE ID from a storage cable inserted into the storage device. Moreover, the method includes determining whether the CABLE ID from the storage cable matches the received CABLE ID. The method also includes actuating an indicator light at the storage device upon determining that the CABLE ID from the storage cable matches the received CABLE ID. Alternatively, the method includes disabling the indicator light at the storage device upon determining that the CABLE ID from the storage cable does not match the received CABLE ID.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure, and are therefore not to be considered as limiting of its scope. These principles are described and explained with additional specificity and detail through the use of the following drawings.

FIG. 2 depicts a flow chart describing the process for authenticating a CABLE ID using the network system 100 of FIG. 1, in accordance with an embodiment of the disclosure;

and

Figure 1A:
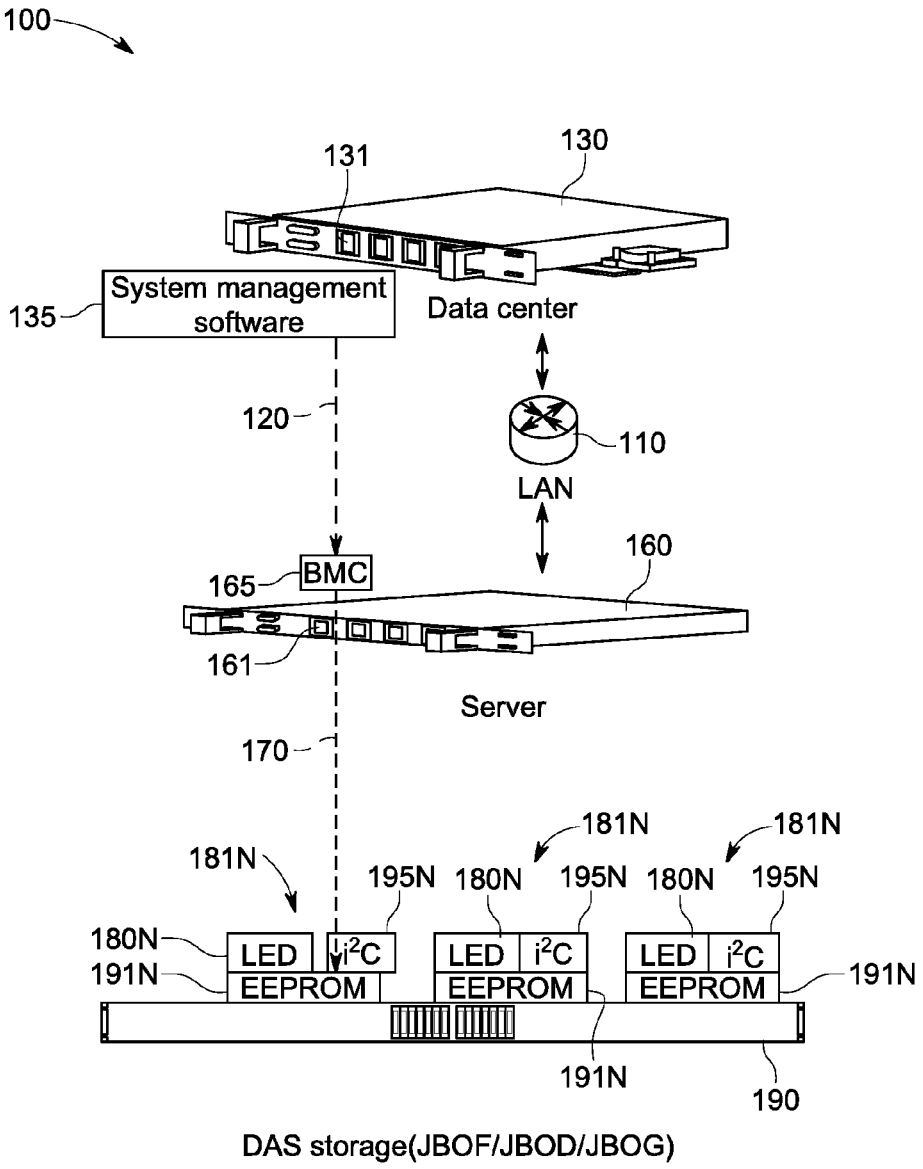
FIG. 1A illustrates a diagram of an example network system, in accordance with an embodiment of the disclosure.

FIG. 3 depicts a flow chart describing the process for disassembling a cable connection of a storage cable from a server device to a storage device, in accordance with an embodiment of the disclosure.

DETAILED DESCRIPTION

The present invention is described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

A network system in accordance with the present disclosure can include a data center, a server device, and a storage device. The data center can include a system-management software. The server device can be connected to the data center. The server device can include a BMC configured to communicate with the system-management software of the data center. The storage device can include at least one cable port configured to receive a storage cable that connects the storage device to the server device. The cable port can include a non-volatile memory, an indicator light, and a $I^2C$ bus.

FIG. 1A illustrates a simplified block diagram of an example network system 100 in accordance with an embodiment of the disclosure. The network system 100 includes a management server 130, a server device 160, and a direct-attached storage (hereinafter "DAS Storage") 190. For the purposes of this example, the network system 100 can be configured as an Intelligent Platform Management Bus (IPMB) architecture.

The DAS storage 190 can be configured as a JBOD ("just a bunch of disks"), or a collection of hard disks that have not been configured to act as a redundant array of independent disks (RAID) array. In other embodiments, the DAS storage 190 can be configured as a JBOF ("just a bunch of flash"), or a collection of solid state drives that have not been configured to act as a redundant array of independent disks (RAID) array. In alternative embodiments, the DAS storage 190 can be configured as a JBOG ("Just a Box of GPUs"), or a collection of graphic processing units. It should be understood by one of ordinary skill in the art that the DAS storage 190 can include any combination thereof as a RAID array.

The management server 130 can include an Ethernet network interface 131. The management server 130 can also include a system-management software 135. The Ethernet network interface 131 can be configured to connect to a Local Area Network (hereinafter "LAN") 110. In other embodiments, other networks can be implemented. For example, in some embodiments, a wide-area network (WAN) can be implemented. The server device 160 is configured to connect to the LAN 110. The server device 160 can be configured to communicate to the system-management tool or software 135 at the management server 130. The management server 130 can be configured to send an Intelligent Platform Management Interface (IPMI) Original Equipment Manufacturer (OEM) command (herein after "IPMI OEM command") 120 to the server device 160 via the LAN 110. This is discussed in greater detail below with respect to FIG. 2.

The server device 160 can include a baseboard management controller (hereinafter "BMC") 165. The BMC 165 can be configured to provide the intelligence in the IPMI architecture (network system 100). The BMC 165 can be a specialized microcontroller embedded on the motherboard (not shown) of the server device 160. The BMC 165 can be configured to manage the interface between the system-management software 135 and the platform hardware of the server device 160.

For example, the BMC 165 can receive reports from sensors within the server device 160 on various parameters such as temperature, cooling fan speeds, power status, operating system (OS) status, etc. The BMC 165 can monitor the sensors and can send alerts to the system-management software 135 via the LAN 110 if any of the parameters exceed pre-set limits, indicating a potential failure of the system. An administrator utilizing the system-management software 135 can also remotely communicate with the BMC 165 to take corrective actions.

The server device 160 can also include an Ethernet network interface 161. The Ethernet network interface 161 can include ports configured to receive a PCI Express (PCIe) card (not shown), or other types of is a high-speed serial computer expansion bus standard. The Ethernet network interface 161 can also include MiniSAS HD cable ports (not shown). The Mini-SAS HD cable ports can provide channel bandwidth of 6 Gb/s, 12 Gb/s, and 14 Gb/s. The DAS storage 190 can include cable ports 181N.

Figure 1B:
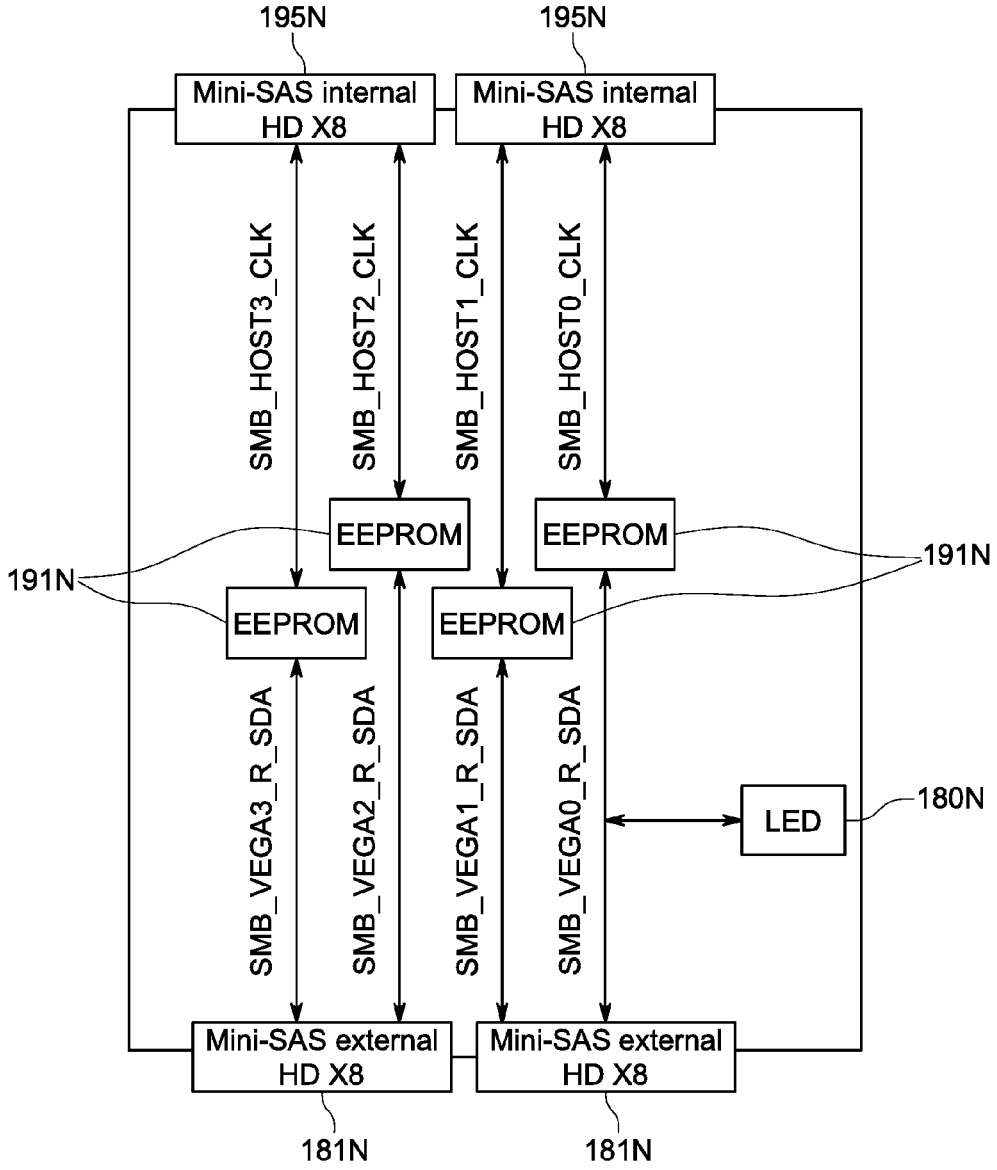
FIG. 1B illustrates a Cable Port of the network system of FIG. 1A, in accordance with an embodiment of the disclosure.

FIG. 1B illustrates a plurality of cable ports 181N of the example network system 100 in accordance with an embodiment of the disclosure. The cable ports 181N can also be configured as MiniSAS HD cable ports. The cable ports 181N can be configured with indicator lights 180N. The indicator lights 180N can be light-emitting diodes (LED). Other types of indicator lights can be implemented herein. The cable ports 181N can also be configured with a non-volatile memory 191N. The non-volatile memory 191N can be configured as Electrically Erasable Programmable Read-Only Memory (EEPROM). It should be understood by one of ordinary skill in the art that the non-volatile memory 191N can include any non-volatile memory used in computers and other electronic devices to store relatively small amounts of data but allowing individual bytes to be erased and reprogrammed. The cable port 181N can also be configured with an Inter-IC ($I^2C$) bus 195N.

The $I^2C$ bus 195N is a bi-directional two-wire serial bus that provides a communication link between the non-volatile memory 191N and the BMC 165 of the server device 160. Specifically, the $I^2C$ bus 195N includes a bidirectional data (SDA) line and a unidirectional serial clock (SCL) line (not shown). This configuration allows for an open-drain, multi-drop bus, meaning that multiple devices can be hooked to the bus and communicate with one another. The bus master transmits this address in the first byte of a message to identify the recipient of the message.

Referring back to FIG. 1, the server device 160 can be connected to the DAS storage 190 by a storage cable 170. The storage cable 170 can be configured as a MiniSAS HD cable. The storage cable 170 can connect a cable port 181N of the DAS storage 190 to the Ethernet network interface 161 of the server device 160. The server device 160 is also configured to connect to the LAN 110 to communicate to the system-management software 135 at the management server 130. Physical interfaces to the BMC 165 can include an Intelligent Platform Management Bus (IPMB), that enables the BMC 165 to accept the IPMI OEM command 120 from the system-management software 135.

FIG. 2 depicts a flow chart describing the process 200 for authenticating a CABLE ID using the network system 100 of FIG. 1. As seen in FIG. 2, the process 200 starts with communication between the system-management software 135 and the BMC 165 in step 201. The system-management software 135 can be configured to send an IPMI OEM command 120 to the BMC 165 of the server device 160. The IPMI OEM command 120 can be received by the BMC 165 via the Ethernet network interface 161. The IPMI OEM command 120 can include a CABLE ID.

Upon receipt of the CABLE ID, the process 200 advances to step 202. At step 202, the BMC 165 can communicate with the non-volatile memory 191N of the DAS storage 190 via the $I^2C$ bus 195N. For example, the BMC 165 can set a value for the DAS storage EEPROM reserve bit to coincide with the received CABLE ID. In some embodiments, the bit value can be set to "1" for enable, or "0" for disable, when authenticating the CABLE ID. At step 203, when the storage cable 170 is connected to the DAS storage 190, the non-volatile memory 191N can detect the CABLE ID of the storage cable 170. At step 204, a determination is made as to whether the CABLE ID of the storage cable 170 matches the received CABLE ID. If the CABLE ID of the storage cable 170 matches the received CABLE ID, the process 200 advances from step 204 to step 205 where the DAS storage 190 actuates the indicator lights 180N to indicate the cable is correct. Conversely, if the CABLE ID of the storage cable 170 does not match the received CABLE ID, the process 200 advances from step 204 to step 206 where the DAS storage 190 can disable the indicator lights 180N to indicate the cable is incorrect.

FIG. 3 depicts a flow chart describing the process 300 for disassembling a cable connection of a storage cable from a server device to a storage device as exemplified in the network system 100 of FIG. 1. As can be seen in FIG. 3, the process starts with communication between the system-management software 135 of the management server 130 and the BMC 165 of the server device 160 in step 301. The system-management software 135 sends a command to the BMC 165 to actuate an indicator light 180N associated with a specific storage cable 170. For example, an administrator operating at the management server 130 can determine that storage cable 170 should be disconnected to the DAS storage 190 to perform maintenance. The administrator can implement the system-management software 135 to identify the appropriate storage cable 170 via the corresponding indicator light 180N. The indicator light 180N can be actuated to illuminate. The illumination of the indicator light 180N can provide a visual indicator to the administrator physically removing the corresponding storage cable 170.

The process 300 advances to 302, where a determination is made as to whether the indicator light 180N is illuminated. For example, an administrator can service the DAS storage 190 and determine whether the indicator light 180N is illuminated. Upon determining that the indicator light 180N is not illuminated, the process advances to 303. At step 303, the assessment at step 302 is repeated to determine which indicator light 180N is illuminated. Conversely, where it is determined that the indicator light is illuminated, the process 300 advances to 304. At step 304, the storage cable 170 is removed from the cable port 181N of the DAS storage 190.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A network system for identifying a cable connection, comprising:

a management server comprising a system-management software;

a server device connected to the management server, wherein the server device comprises a baseboard management controller (BMC) configured to communicate with the system-management software of the management server; and at least one storage device, wherein the storage device comprises at least one cable port configured to receive a storage cable that connects the storage device to the server device, wherein the cable port comprises a non-volatile memory, an indicator light, and a $I^2C$ bus, wherein the cable port is operable to illuminate the indicator light in response to matching a CABLE ID of the storage cable to a received CABLE ID included in an intelligent platform management interface original equipment manufacturer command (IPMI OEM command).

2. The network system of claim 1, wherein the server device is communicatively coupled to the management server via a local area network.

3. The network system of claim 1, wherein the storage device comprises a direct-attached storage (DAS).

4. The network system of claim 1, wherein the non-volatile memory comprises Electrically Erasable Programmable Read-Only Memory (EEPROM).

5. The network system of claim 1, wherein the indicator light comprises a light-emitting diodes (LED).

6. The network system of claim 1, wherein the at least one storage device comprises at least one of: a JBOD, a JBOF, a JBOG, and/or any combination thereof as a RAID array.

7. The network system of claim 1, wherein the system-management software is configured to send the IPMI OEM command to the BMC of the server device.

8. The network system of claim 1, wherein the storage cable comprises a MiniSAS HD cable.

9. The network system of claim 8, wherein the MiniSAS HD cable connects a cable port of the at least one storage device to an Ethernet network interface of the server device.

10. A method for authenticating a CABLE ID, comprising:

receiving, at a baseboard management controller (BMC) on a server device, an intelligent platform management interface original equipment manufacturer command (IPMI OEM command) comprising a CABLE ID;

transmitting, by the BMC, a value for a reserve bit associated with a storage device based on the received CABLE ID;

detecting, by the storage device, a CABLE ID from a storage cable inserted into the storage device;

determining whether the CABLE ID from the storage cable matches the received CABLE ID;

actuating at least one indicator light at the storage device upon determining that the CABLE ID from the storage cable matches the received CABLE ID; and disabling the at least one indicator light at the storage device upon determining that the CABLE ID from the storage cable does not match the received CABLE ID.

11. The method of claim 10, wherein the storage device comprises a direct-attached storage (DAS).

12. The method of claim 10, wherein the storage cable comprises a MiniSAS HD cable.

13. The method of claim 10, wherein the non-volatile memory comprises Electrically Erasable Programmable Read-Only Memory (EEPROM).

14. The method of claim 10, wherein the indicator light comprises a light-emitting diodes (LED).

15. The method of claim 10, wherein the storage device comprises at least one of: a JBOD, a JBOF, a JBOG, and/or any combination thereof as a RAID array.

*16. The network system of claim 1, wherein the IPMI OEM command is received by the BMC via an Ethernet network interface of the server device.*

*17. The method of claim 10, wherein receiving the IPMI OEM command comprises receiving the IPMI OEM command via an Ethernet network interface of the server device.*

* * * * *